US012580643B2

(12) United States Patent
Zhu

(10) Patent No.: US 12,580,643 B2
(45) Date of Patent: Mar. 17, 2026

(54) TIMING ADJUSTMENT METHOD AND DEVICE, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/272,334

(22) PCT Filed: Jan. 13, 2021

(86) PCT No.: PCT/CN2021/071589
§ 371 (c)(1),
(2) Date: Jul. 13, 2023

(87) PCT Pub. No.: WO2022/151093
PCT Pub. Date: Jul. 21, 2022

(65) Prior Publication Data
US 2024/0405860 A1 Dec. 5, 2024

(51) Int. Cl.
*H04B 7/185* (2006.01)
*H04J 3/06* (2006.01)
*H04W 56/00* (2009.01)

(52) U.S. Cl.
CPC ..... *H04B 7/18589* (2013.01); *H04B 7/18539* (2013.01); *H04J 3/0617* (2013.01); *H04W 56/0005* (2013.01)

(58) Field of Classification Search
CPC ............ H04B 7/18526; H04B 7/18528; H04B 7/18532; H04B 7/18539; H04B 7/18589;
(Continued)

(56) References Cited

U.S. PATENT DOCUMENTS

| 10,554,293 B1 * | 2/2020 | Chin | ................... H04W 56/004 |
| 2009/0239568 A1 * | 9/2009 | Bertrand | ........... H04W 52/0225 |
| | | | 455/522 |

(Continued)

FOREIGN PATENT DOCUMENTS

| CN | 101753202 A | 6/2010 |
| CN | 102111257 A | 6/2011 |

(Continued)

OTHER PUBLICATIONS

International Search Report of PCT/CN2021/071589 dated Mar. 25, 2021 with English translation, (6p).
(Continued)

*Primary Examiner* — Alpus Hsu
(74) *Attorney, Agent, or Firm* — Arch & Lake LLP

(57) ABSTRACT
A timing adjustment method includes: reporting, by a terminal supporting an internet of things (IoT) service in a satellite communication system, target information, the target information is information related to a timing adjustment requested by the terminal; and performing, by the terminal, in response to not receiving new timing adjustment information, the timing adjustment based on original timing adjustment information; or performing, by the terminal, in response to receiving new timing adjustment information, the timing adjustment based on the new timing adjustment information.

20 Claims, 12 Drawing Sheets

(58) Field of Classification Search
CPC . H04J 3/0617; H04J 3/0635; H04W 56/0005;
H04W 56/004
See application file for complete search history.

(56) References Cited

U.S. PATENT DOCUMENTS

| | | | |
|---|---|---|---|
| 2011/0176535 A1 | 7/2011 | Lipka et al. | |
| 2013/0244719 A1 | 9/2013 | Nukala et al. | |
| 2016/0028533 A1* | 1/2016 | Kazmi | H04W 56/0045 |
| | | | 370/296 |
| 2017/0339712 A1 | 11/2017 | Rico Alvarino et al. | |
| 2019/0053228 A1* | 2/2019 | Akkarakaran | H04W 72/02 |
| 2019/0349077 A1* | 11/2019 | Alasti | H04B 7/2125 |
| 2020/0059879 A1* | 2/2020 | Nam | H04W 76/27 |
| 2020/0374728 A1* | 11/2020 | Manolakos | H04W 24/10 |
| 2020/0396709 A1* | 12/2020 | Sun | H04W 56/001 |

FOREIGN PATENT DOCUMENTS

| | | |
|---|---|---|
| CN | 102238721 A | 11/2011 |
| CN | 102356678 A | 2/2012 |
| CN | 108882260 A | 11/2018 |
| CN | 109348740 A | 2/2019 |
| CN | 109526002 A | 3/2019 |
| CN | 109565774 A | 4/2019 |
| CN | 109788543 A | 5/2019 |
| CN | 109788548 A | 5/2019 |
| CN | 110024457 A | 7/2019 |
| CN | 110999427 A | 4/2020 |
| CN | 111278155 A | 6/2020 |
| CN | 111713153 A | 9/2020 |
| CN | 111770565 A | 10/2020 |
| CN | 111836355 A | 10/2020 |
| CN | 111867039 A | 10/2020 |
| CN | 111867041 A | 10/2020 |
| CN | 111988099 A | 11/2020 |
| CN | 112055988 A | 12/2020 |
| CN | 112154707 A | 12/2020 |
| WO | 2011082525 A1 | 7/2011 |
| WO | 2022151093 A1 | 7/2022 |

OTHER PUBLICATIONS

First Office Action issued to Chinese Application No. 202180000549.9 dated Jun. 1, 2022 with English translation, (11p).
Second Office Action issued to Chinese Application No. 202180000549.9 dated Jan. 4, 2023 with English translation, (11p).
Oppo, "Consideration on MAC enhancement for NTN", 3GPP TSG-RAN WG2 Meeting #111 electronic online, R2-2006781, dated Aug. 17-28, 2020, (11p).

* cited by examiner the nth downlink data packet sent by the base station

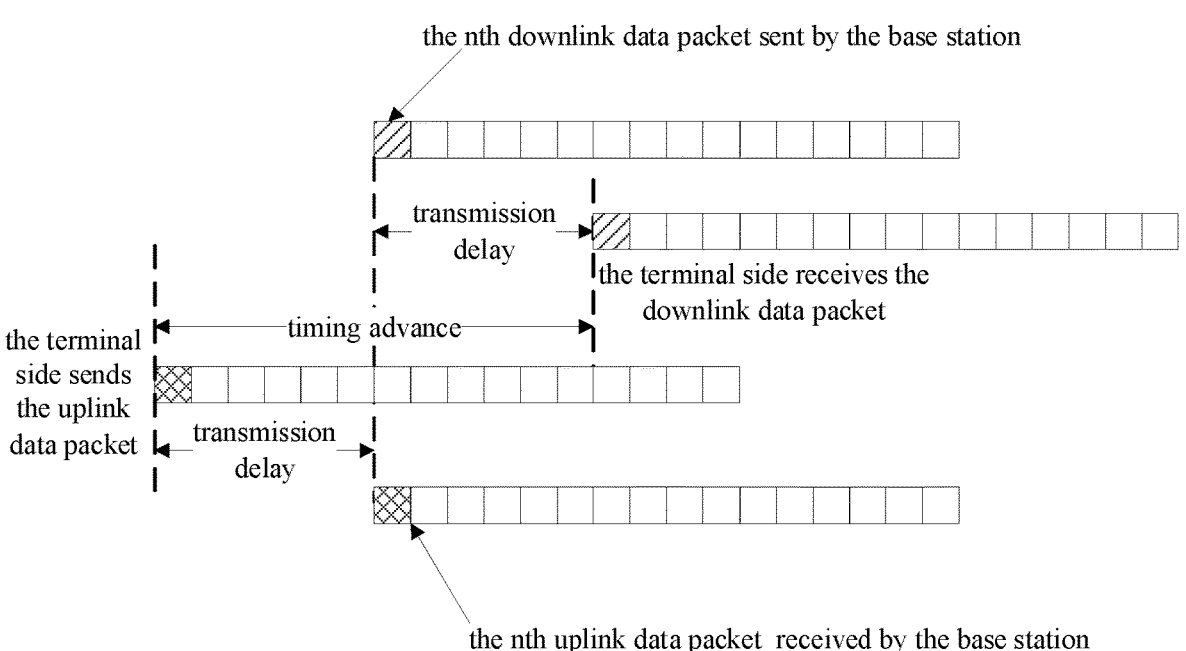

transmission delay the terminal side receives the downlink data packet timing advance the terminal side sends the uplink data packet transmission delay the nth uplink data packet received by the base station

FIG. 1A the nth downlink data packet sent by the base station transmission delay the terminal receives the downlink data packet

TA the terminal sends the uplink data packet transmission delay the nth uplink data packet received by the base station uplink and downlink frame timing offset

FIG. 1B

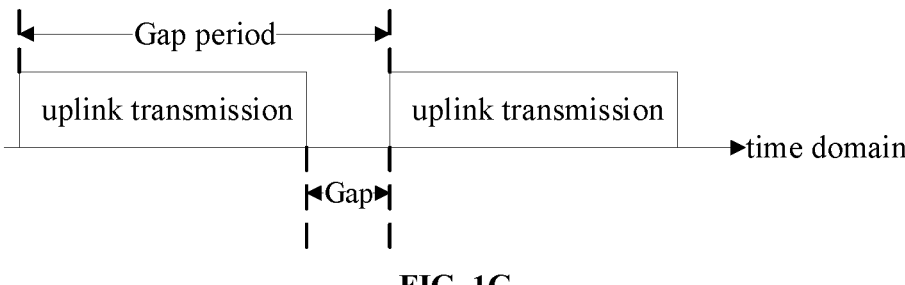

FIG. 1C

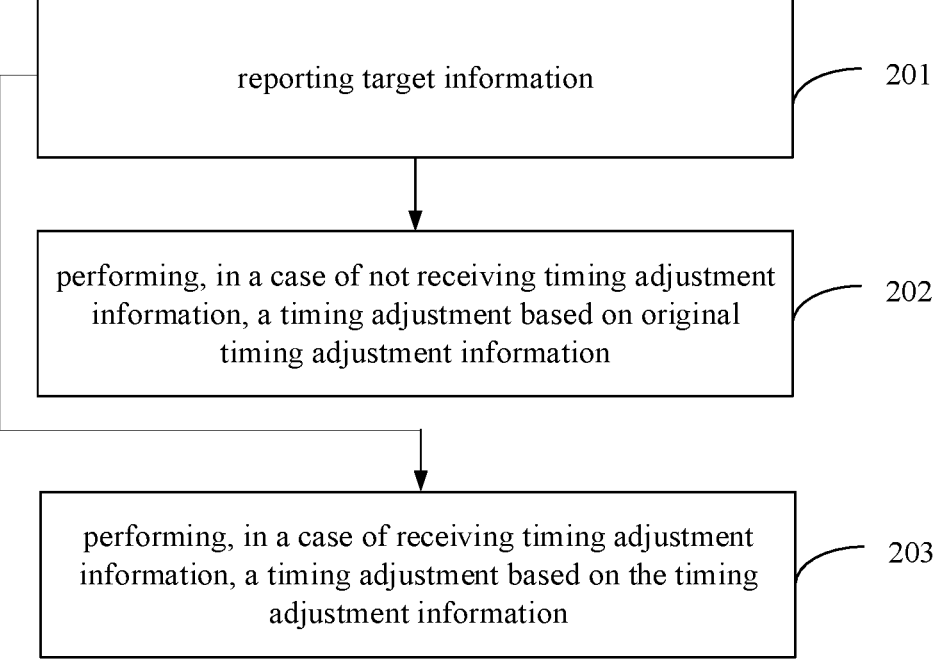

reporting target information — 201 performing, in a case of not receiving timing adjustment information, a timing adjustment based on original timing adjustment information — 202 performing, in a case of receiving timing adjustment information, a timing adjustment based on the timing adjustment information — 203

FIG. 2

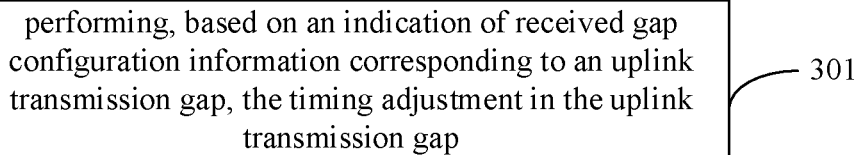

performing, based on an indication of received gap configuration information corresponding to an uplink transmission gap, the timing adjustment in the uplink transmission gap — 301

FIG. 3 performing the timing adjustment in the second gap duration indicated by the gap configuration information — 401

FIG. 4A

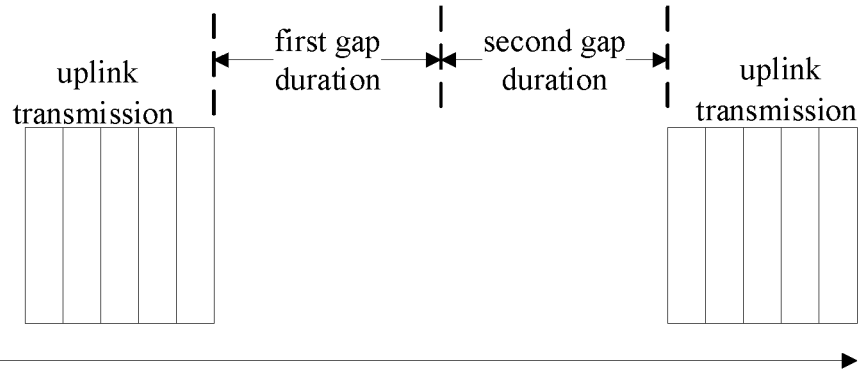
FIG. 4B
performing, in the third gap duration indicated by the gap configuration information, at least one of the downlink synchronization or the timing adjustment — 501
FIG. 5A
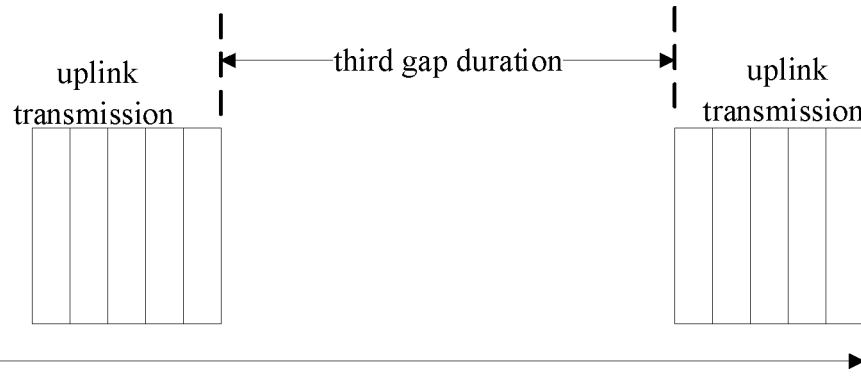
FIG. 5B

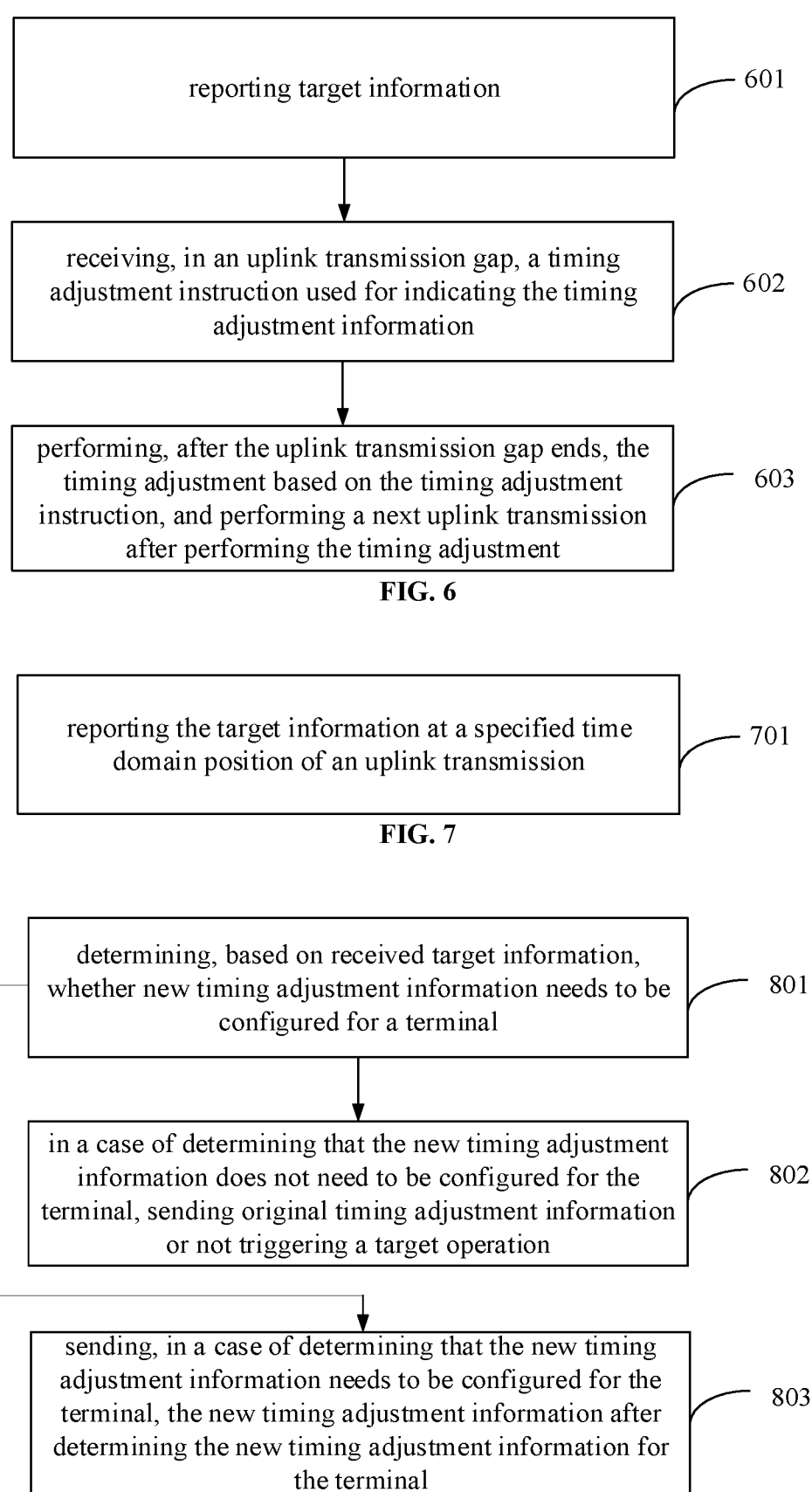

reporting target information — 601 receiving, in an uplink transmission gap, a timing adjustment instruction used for indicating the timing adjustment information — 602 performing, after the uplink transmission gap ends, the timing adjustment based on the timing adjustment instruction, and performing a next uplink transmission after performing the timing adjustment — 603

FIG. 6 reporting the target information at a specified time domain position of an uplink transmission — 701

FIG. 7 determining, based on received target information, whether new timing adjustment information needs to be configured for a terminal — 801 in a case of determining that the new timing adjustment information does not need to be configured for the terminal, sending original timing adjustment information or not triggering a target operation — 802 sending, in a case of determining that the new timing adjustment information needs to be configured for the terminal, the new timing adjustment information after determining the new timing adjustment information for the terminal — 803

FIG. 8

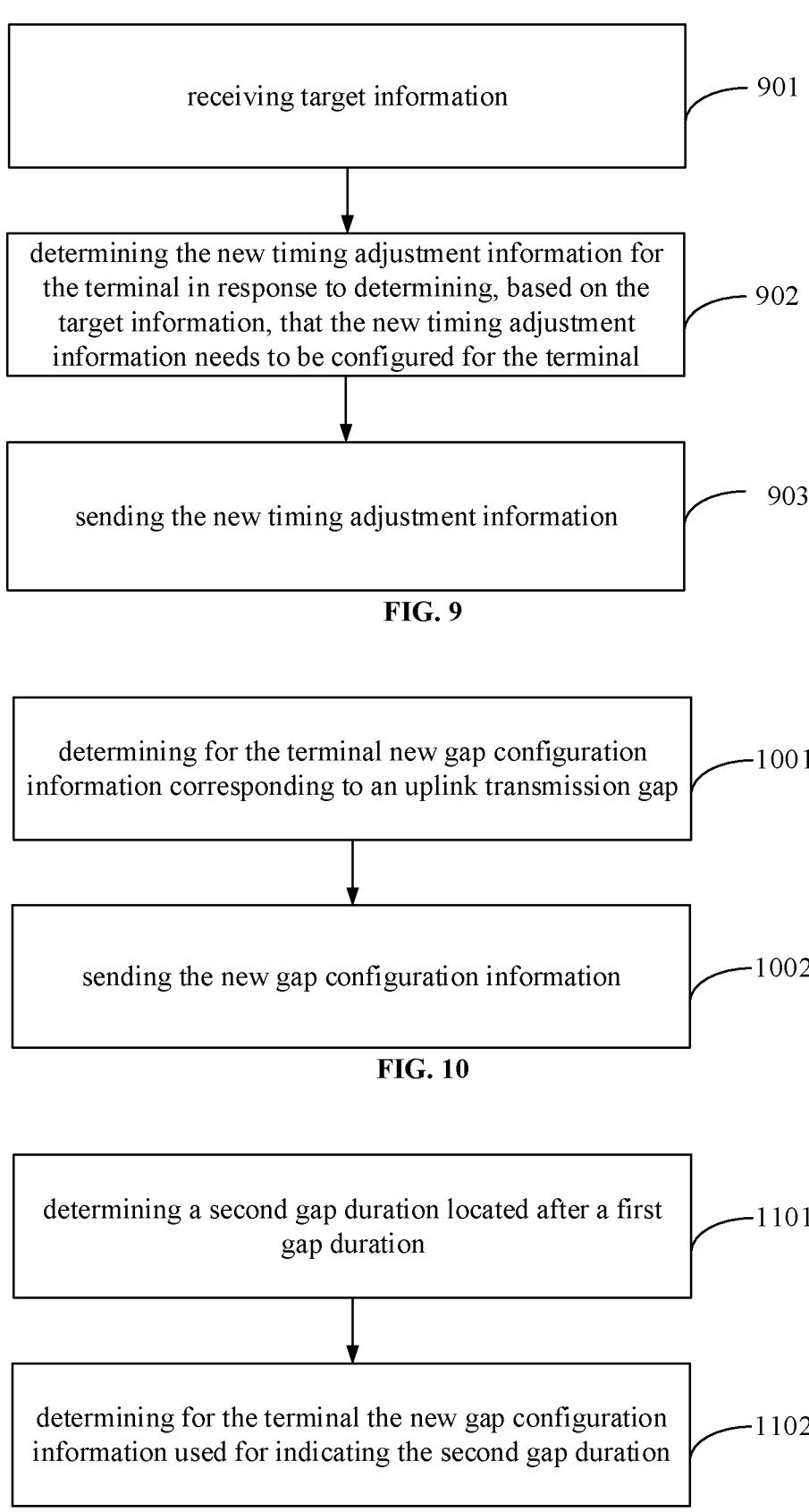

receiving target information ⎯ 901 determining the new timing adjustment information for the terminal in response to determining, based on the target information, that the new timing adjustment information needs to be configured for the terminal ⎯ 902 sending the new timing adjustment information ⎯ 903

FIG. 9 determining for the terminal new gap configuration information corresponding to an uplink transmission gap ⎯ 1001 sending the new gap configuration information ⎯ 1002

FIG. 10 determining a second gap duration located after a first gap duration ⎯ 1101 determining for the terminal the new gap configuration information used for indicating the second gap duration ⎯ 1102

FIG. 11

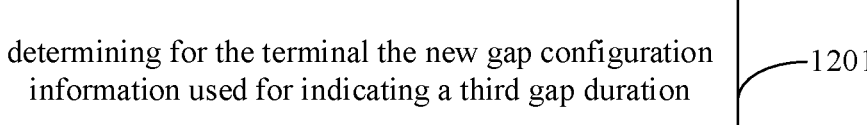

determining for the terminal the new gap configuration information used for indicating a third gap duration ⌐1201

FIG. 12

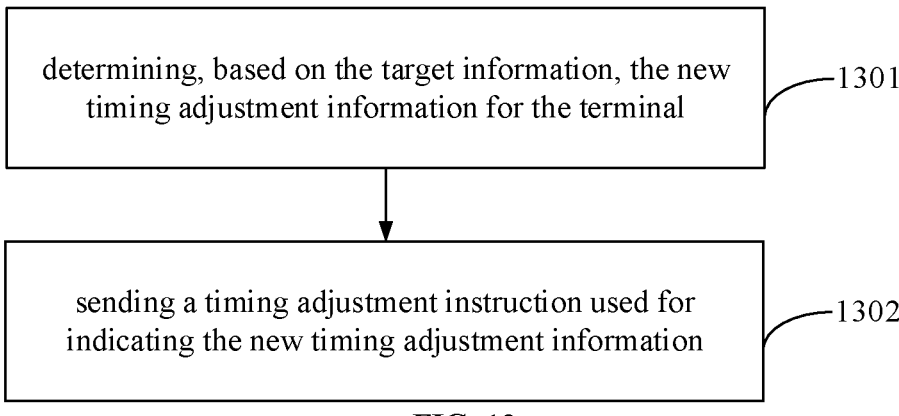

determining, based on the target information, the new timing adjustment information for the terminal ⌐1301 sending a timing adjustment instruction used for indicating the new timing adjustment information ⌐1302

FIG. 13

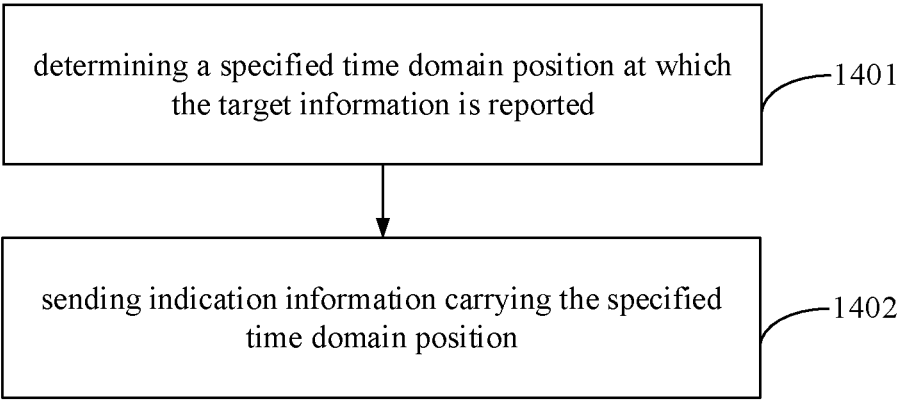

determining a specified time domain position at which the target information is reported ⌐1401 sending indication information carrying the specified time domain position ⌐1402

FIG. 14

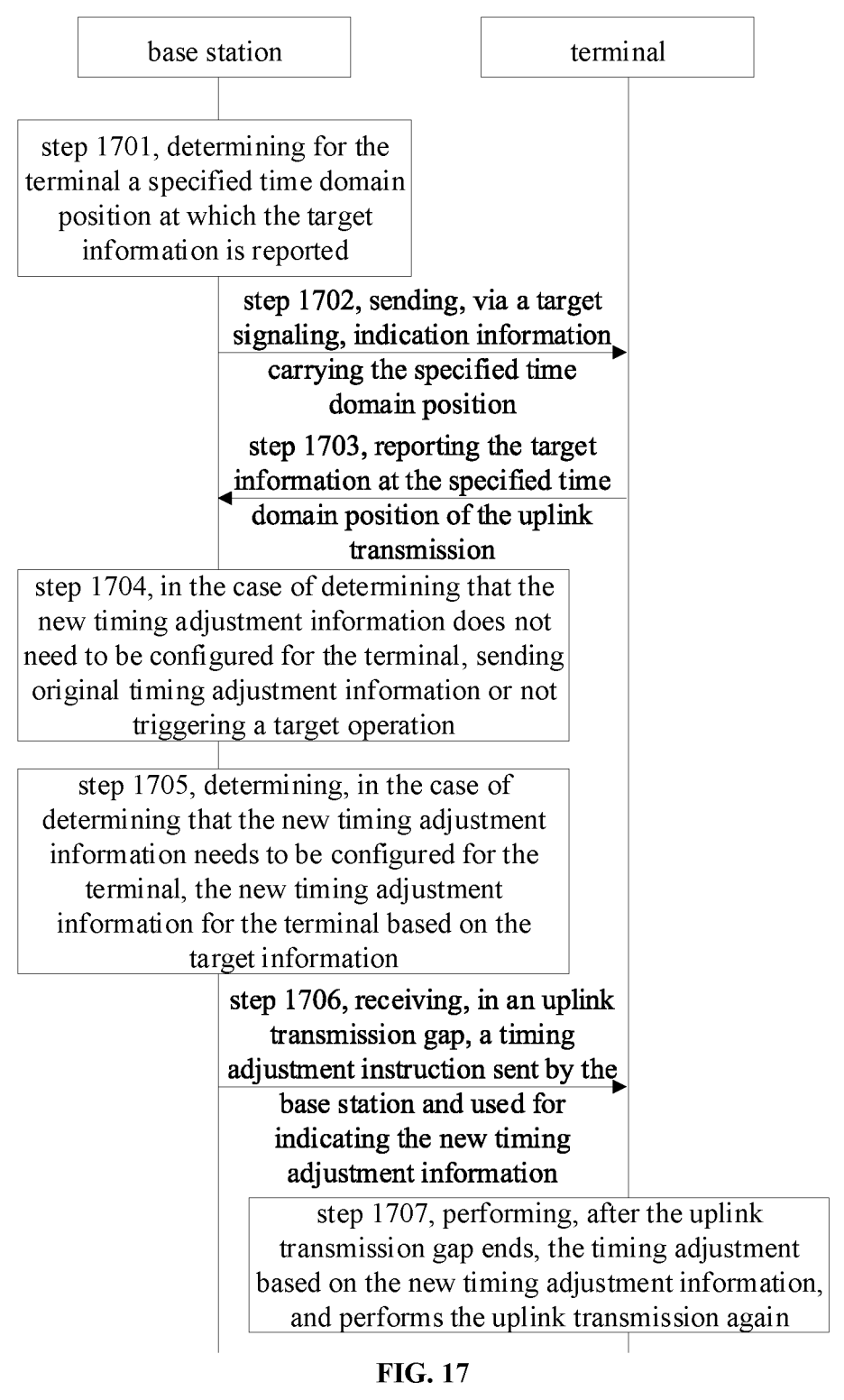

| base station | | terminal |
|---|---|---| step 1701, determining for the terminal a specified time domain position at which the target information is reported step 1702, sending, via a target signaling, indication information carrying the specified time domain position step 1703, reporting the target information at the specified time domain position of the uplink transmission step 1704, in the case of determining that the new timing adjustment information does not need to be configured for the terminal, sending original timing adjustment information or not triggering a target operation step 1705, determining, in the case of determining that the new timing adjustment information needs to be configured for the terminal, the new timing adjustment information for the terminal based on the target information step 1706, receiving, in an uplink transmission gap, a timing adjustment instruction sent by the base station and used for indicating the new timing adjustment information step 1707, performing, after the uplink transmission gap ends, the timing adjustment based on the new timing adjustment information, and performs the uplink transmission again

FIG. 17

TIMING ADJUSTMENT METHOD AND DEVICE, AND STORAGE MEDIUM

CROSS-REFERENCE TO RELATED APPLICATION

The present application is the U.S. National Stage of International Application No. PCT/CN2021/071589, filed on Jan. 13, 2021, the disclosure of which is incorporated herein by reference in its entirety for all purposes.

BACKGROUND

In the research of wireless communication technology, satellite communication is considered to be an important aspect of the development of the future wireless communication technology. The satellite communication refers to the communication carried out by a radio communication device on the ground using a satellite as a relay. The satellite communication system consists of a satellite part and a ground part. The characteristics of the satellite communication are: a large communication range; communication may be carried out between any two points as long as they are within the range covered by the radio waves emitted by the satellite; and being not easily affected by land disasters (high reliability). As a supplement to the current terrestrial cellular communication system, the satellite communication may have the following advantages: first, extended coverage can be achieved, for areas where the current cellular communication system is unable to cover or have high coverage costs, such as oceans, deserts, remote mountainous areas, etc., the satellite communication may be used to solve the communication problems; second, emergency communication can be carried out, for example, in the case of an extreme situation where a disaster such as an earthquake occurs, which makes the cellular communication infrastructure unavailable, the satellite communication may be used to quickly establish a communication connection. In addition, the satellite communication can also provide industry applications, for example, for delay-sensitive services of long-distance transmission, the satellite communication may be used to reduce the delay of service transmission.

In the current terrestrial cellular communication, the terminal capabilities such as power are limited for terminals that support an internet of things (IoT) service. Therefore, in order to meet the coverage requirements, a repeated transmission method is supported, which means that the terminal may repeatedly transmit or receive the same data block based on the configuration information of the base station to ensure the reliability of data transmission or reception, thereby meeting the performance requirements of coverage. Currently, a maximum of 2048 retransmissions are supported. In this long-term consecutive transmission, in order to maintain synchronization performance, a gap is introduced between consecutive uplink retransmissions. In the gap, the terminal may stop uplink transmission and perform downlink time-frequency synchronization.

However, in scenarios of the satellite communication, the duration of the gap is limited, and due to the high-speed movement of the satellite, timing adjustment may be difficult to complete in the duration of the gap.

SUMMARY

The present disclosure relates to the field of communication, in particular to a timing adjustment method and device, and a storage medium. Examples of the present disclosure provide a timing adjustment method and device, and storage medium.

According to a first aspect of the present disclosure, a timing adjustment method is provided. The method is applied to a terminal supporting an internet of things (IoT) service in a satellite communication system, and includes: reporting target information, the target information is information related to a new timing adjustment requested by the terminal; and performing, in a case of not receiving timing adjustment information, a timing adjustment based on original timing adjustment information; or performing, in a case of receiving timing adjustment information, a timing adjustment based on the timing adjustment information.

According to a second aspect of the present disclosure, a timing adjustment method is provided. The method is applied to a base station in a satellite communication system, and includes: determining, based on received target information, whether new timing adjustment information needs to be configured for a terminal; the target information is information related to a new timing adjustment requested by the terminal supporting an IoT service; and in a case of determining that the new timing adjustment information does not need to be configured for the terminal, sending original timing adjustment information or not triggering a target operation; the target operation is an operation related to sending the timing adjustment information; or sending, in a case of determining that the new timing adjustment information needs to be configured for the terminal, the new timing adjustment information after determining the new timing adjustment information for the terminal.

According to a third aspect of the present disclosure, a computer-readable storage medium is provided. The storage medium stores a computer program, and the computer program is used for implementing the timing adjustment method according to any one of the first aspect described above.

According to a fourth aspect of the present disclosure, a computer-readable storage medium is provided. The storage medium stores a computer program, and the computer program is used for implementing the timing adjustment method according to any one of the second aspect described above.

According to a fifth aspect of the present disclosure, a timing adjustment device is provided. The timing adjustment device includes: a processor; and a memory, configured to store an instruction executable by the processor; the processor is configured to implement the timing adjustment method according to any one of the first aspect described above.

According to a sixth aspect of the present disclosure, a timing adjustment device is provided. The timing adjustment device includes: a processor; and a memory, configured to store an instruction executable by the processor; the processor is configured to implement the timing adjustment method according to any one of the second aspect described above.

It should be understood that the above general description and the later detailed description are only examples and explanations and do not limit the present disclosure.

BRIEF DESCRIPTION OF THE DRAWINGS

The accompanying drawings herein are incorporated into and form part of the specification, illustrate examples consistent with the present disclosure, and are used in conjunction with the specification to explain the principles of the present disclosure.

FIG. 1A is a schematic diagram of a scenario where uplink and downlink are aligned at a base station side illustrated according to one example.

FIG. 1B is a schematic diagram of a scenario where uplink and downlink are not aligned at a base station side illustrated according to one example.

FIG. 1C is a schematic diagram of a scenario of an uplink transmission gap illustrated according to one example.

FIG. 2 is a schematic flow diagram of a timing adjustment method illustrated according to one example.

FIG. 3 is a schematic flow diagram of another timing adjustment method illustrated according to one example.

FIG. 4A is a schematic flow diagram of another timing adjustment method illustrated according to one example.

FIG. 4B is a schematic diagram of a scenario where a timing adjustment is performed illustrated according to one example.

FIG. 5A is a schematic flow diagram of another timing adjustment method illustrated according to one example.

FIG. 5B is a schematic diagram of a scenario where another timing adjustment is performed illustrated according to one example.

FIG. 6 is a schematic flow diagram of another timing adjustment method illustrated according to one example.

FIG. 7 is a schematic flow diagram of another timing adjustment method illustrated according to one example.

FIG. 8 is a schematic flow diagram of another timing adjustment method illustrated according to one example.

FIG. 9 is a schematic flow diagram of another timing adjustment method illustrated according to one example.

FIG. 10 is a schematic flow diagram of another timing adjustment method illustrated according to one example.

FIG. 11 is a schematic flow diagram of another timing adjustment method illustrated according to one example.

FIG. 12 is a schematic flow diagram of another timing adjustment method illustrated according to one example.

FIG. 13 is a schematic flow diagram of another timing adjustment method illustrated according to one example.

FIG. 14 is a schematic flow diagram of another timing adjustment method illustrated according to one example.

FIG. 17 is a schematic flow diagram of another timing adjustment method illustrated according to one example.

DETAILED DESCRIPTION

Figure 15:
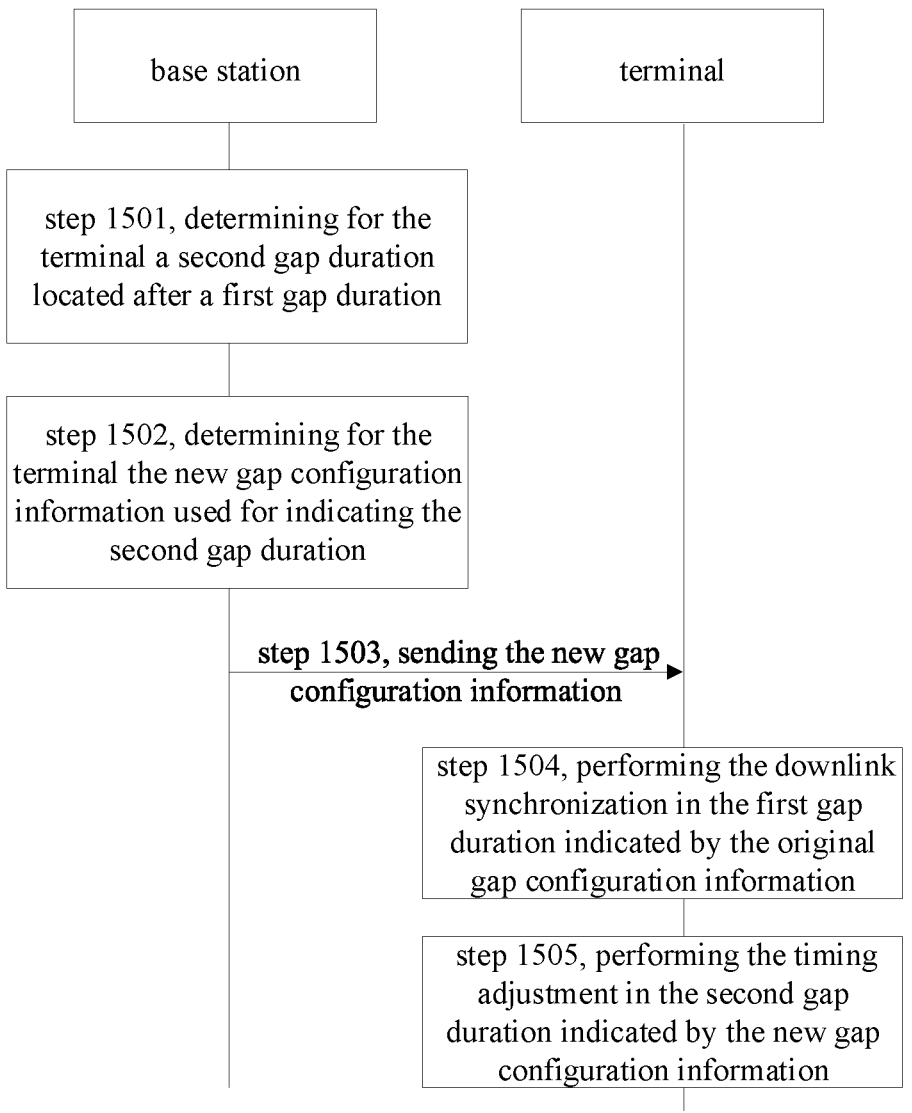
FIG. 15 is a schematic flow diagram of another timing adjustment method illustrated according to one example.

Examples of the present disclosure are described below in conjunction with the accompanying drawings. The examples described herein do not represent all examples consistent with the present disclosure. On the contrary, they are only examples of devices and methods that are consistent with some aspects of the present disclosure as detailed in the appended claims.

The terms used in the present disclosure are for the purpose of describing particular examples only and are not intended to limit the present disclosure. The singular forms of "a", "the" and "this" as used in the present disclosure and the appended claims are also intended to include the majority forms, unless the context clearly indicates other meanings. It should also be understood that the term "and/or" as used herein refers to and includes any or all possible combinations of one or more of the associated listed items.

It should be understood that although the terms first, second, third, etc., may be used in the present disclosure to describe various information, such information should not be limited to these terms. These terms are used only to distinguish the same type of information from one another. For example, without departing from the scope of the present disclosure, the first information may also be referred to as the second information, and similarly, the second information may also be referred to as the first information. Depending on the context, for example, the word "if" as used herein may be interpreted as "in the case of . . . " or "when . . . " or "in response to determining".

Before describing the timing adjustment schemes provided by the present disclosure, a description of the manners in which the timing adjustment is performed is provided.

The first manner takes into account the existence of a long signal transmission distance between the transmitter and the receiver, which results in a longer data transmission time. For the transmission where there is an uplink and downlink relationship, the relevant standardization discussion identifies the introduction of the parameter, K offset value (Koffset) to compensate for the transmission delay.

In the second manner, timing advance (TA) method may be used to allow a terminal to send a data packet in advance.

Referring to FIG. 1A, the nth downlink data packet sent by a base station reaches the terminal side after a certain transmission delay, and the nth uplink data packet sent by the terminal side has a specified TA value relative to the received nth downlink data packet, so that the time point at which the nth uplink data packet reaches the base station side is the same as the time point at which the base station side sends the nth downlink data packet. That is, the uplink and downlink timing alignment is achieved at the base station side.

Alternatively, referring to FIG. 1B, the uplink and downlink timing at the base station side may not be aligned, and there is a specified frame timing offset between the nth downlink data packet sent by the base station side and the received nth uplink data packet.

Either of the above manners can achieve the timing adjustment.

In the one example of the present disclosure, during the uplink repeated transmission performed by the terminal supporting an IoT service, downlink time-frequency synchronization may be performed in the uplink transmission gap, as shown in FIG. 1C, i.e., the terminal is synchronized with the received base station signal, and the synchronization position is at the terminal side. Considering that in the satellite communication scenarios, it is difficult to complete the timing adjustment in the gap duration due to the high-speed movement of the satellite, the problem that the timing adjustment cannot be completed due to the high-speed movement of the satellite can be solved by adjusting the manner of the timing adjustment.

In addition, in the satellite communication system of the examples of the present disclosure, the base station may be set on the satellite, i.e., the satellite directly interacts with the terminal side as the base station, or the base station may be set on the ground and interacts with the terminal side through the satellite as a relay, and the present disclosure does not limit the position of the base station.

The timing adjustment schemes provided by the present disclosure are introduced from the terminal side first below.

Referring to FIG. 2, FIG. 2 is a flow diagram of a timing adjustment method illustrated according to one example, and the method may be applied to the terminal and includes the following steps 201 to 203.

At step 201, target information is reported. The target information is information related to a new timing adjustment requested by the terminal, i.e., the target information is information related to the timing request desired by the terminal, and the target information includes, but is not limited to, at least one of the Koffset parameter or the TA value, as desired by the terminal for use in performing the timing adjustment.

At step 202, a timing adjustment is performed based on original timing adjustment information in a case of not receiving timing adjustment information. If the terminal does not receive the timing adjustment information within the preset time period, the terminal may perform the timing adjustment based on the original timing adjustment information previously configured for the terminal by the base station.

At step 203, a timing adjustment is performed based on timing adjustment information in a case of receiving the timing adjustment information. The timing adjustment information received by the terminal may be the original timing adjustment information, and the terminal performs, after receiving the original timing adjustment information, the timing adjustment in accordance with the relevant arts based on the original timing adjustment information; or the timing adjustment information received by the terminal may be the new timing adjustment information determined by the base station for the terminal, and the terminal performs the timing adjustment based on the new timing adjustment information.

For example, the original timing adjustment information of the terminal includes TA value 1, the reported target information includes the information related to the new timing adjustment requested by the terminal, including TA value 2, and if the terminal receives the timing adjustment information which includes TA value 1, the terminal performs the timing adjustment according to the original timing adjustment information. If the terminal receives the timing adjustment information which includes TA value 2, the terminal performs the timing adjustment based on TA value 2.

In the above example, the terminal may send the target information to the base station, so that the base station may determine whether the new timing adjustment information needs to be configured for the terminal. Furthermore, the terminal may, in the case of not receiving the timing adjustment information, perform the timing adjustment based on the original timing adjustment information; or the terminal may, in the case of receiving the timing adjustment information, perform the timing adjustment based on the received timing adjustment information. The present disclosure can solve the problem that the timing adjustment cannot be completed due to the high-speed movement of the satellite in the satellite communication system, and ensure the reliability of the data interaction.

In some examples, referring to FIG. 3, FIG. 3 is a flow diagram of a timing adjustment method illustrated according to one example, and the method may include the following step 301.

At step 301, the timing adjustment is performed in an uplink transmission gap based on an indication of received gap configuration information corresponding to the uplink transmission gap. The terminal may perform the timing adjustment in the uplink transmission gap based on the indication of the received gap configuration information. The received gap configuration information is the same as original gap configuration information, and the terminal may perform the timing adjustment in accordance with the relevant arts.

In another example, the received gap configuration information is new gap configuration information, and the terminal may perform the timing adjustment based on the new gap configuration information.

In the above example, the terminal may perform the timing adjustment based on the gap configuration information, solving the problem that the timing adjustment cannot be completed due to the high-speed movement of the satellite, and ensuring the reliability of the data interaction.

FIG. 4A, is a flow diagram of a timing adjustment method illustrated according to one example. The method may include the following step 401.

In the step 401, the timing adjustment is performed in a second gap duration indicated by the gap configuration information. The gap configuration information received by the terminal is the same as the original gap configuration information, and the terminal performs the timing adjustment based on the original gap configuration information in accordance with the relevant arts.

In another example, the gap configuration information received by the terminal is the new gap configuration information, and at least partial duration indicated by the new gap configuration information is used for the terminal to perform downlink synchronization, then the terminal performs the downlink synchronization based on the new gap configuration information.

In the above example, the terminal may perform, in the case of the received gap configuration information being the new gap configuration information, the timing adjustment in the second gap duration indicated by the new gap configuration information, for example, as shown in FIG. 4B, it is realized to solve the problem that the timing adjustment cannot be completed due to the high-speed movement of the satellite in the satellite communication system, and to ensure the reliability of the data interaction.

In some examples, the terminal may still perform the downlink synchronization in a first gap duration indicated by the original gap configuration information, and perform the timing adjustment in the second gap duration after the first gap duration, where the second gap duration may be determined based on the received gap configuration information, for example, as shown in FIG. 4B.

FIG. 5A, is a flow diagram of a timing adjustment method illustrated according to one example. The method may include the following step 501.

At step 501, at least one of the downlink synchronization or the timing adjustment is performed in the third gap duration indicated by the gap configuration information. this gap configuration information may be the same as the original gap configuration information, and the terminal may perform the downlink synchronization in accordance with the relevant arts. Or, if the terminal receives the new gap configuration information determined by the base station for the terminal, the terminal may perform at least one of the downlink synchronization or the timing adjustment in the third gap duration indicated by the new gap configuration information, for example, as shown in FIG. 5B.

The above example achieves the purpose of configuring timing adjustment information for the terminal supporting the IoT service in the satellite communication system, solving the problem that timing adjustment cannot be completed due to the high-speed movement of the satellite, and ensuring the reliability of the data interaction.

FIG. 6 is a flow diagram of a timing adjustment method illustrated according to one example, and the method may include the following steps 601 to 603.

At step 601, target information is reported. The target information is information related to a new timing adjustment requested by the terminal.

At step 602, a timing adjustment instruction used for indicating the timing adjustment information is received in an uplink transmission gap. The terminal may receive the timing adjustment instruction in an uplink repeated transmission gap. The timing adjustment information indicated by the timing adjustment instruction may be the original timing adjustment information, or the new timing adjustment information.

At step 603, after the uplink transmission gap ends, the timing adjustment is performed based on the timing adjustment instruction, and a next uplink transmission is performed after the timing adjustment is performed. The terminal, in the case of receiving the original timing adjustment information, may perform the timing adjustment in accordance with the relevant arts.

In the case of receiving the new timing adjustment information, the terminal may perform, after the uplink transmission gap ends, the timing adjustment based on the new timing adjustment information, where the new timing adjustment information includes, but is not limited to, at least one of the new Koffset parameter or the new TA value, and then the terminal may perform the uplink transmission again.

In the above example, the terminal may report the target information at the specified time domain position of the uplink transmission, and receive the timing adjustment information sent by the base station in the uplink transmission gap, and thereby performing, after the uplink transmission gap ends, the timing adjustment based on the received timing adjustment information, and then performing the uplink transmission again. The present disclosure can solve the problem that the timing adjustment cannot be completed due to the high-speed movement of the satellite in the satellite communication system, and ensure the reliability of the data interaction.

Referring to FIG. 7, FIG. 7 is a flow diagram of a timing adjustment method illustrated according to one example, and the method may include the following step 701.

At step 701, the target information is reported at a specified time domain position of an uplink transmission. The target information is information related to a new timing adjustment requested by the terminal, and the target information includes, but is not limited to, at least one of the Koffset parameter or the TA value, as desired by the terminal for use in performing the timing adjustment. The terminal may report the target information at the specified time domain position, so that the base station may determine whether the terminal needs to perform the timing adjustment based on the target information, which is easy to implement and has high availability.

In one example, the terminal receives indication information used for indicating the specified time domain position, and reports the target information at the specified time domain position of the uplink transmission.

In another example, the terminal directly determines, based on agreement of a protocol, the specified time domain position of the uplink transmission, and reports the target information at the specified time domain position of the uplink transmission.

Hereinafter, the timing adjustment schemes provided by the present disclosure are introduced again from the base station side.

Referring to FIG. 8, FIG. 8 is a flow diagram of a timing adjustment method illustrated according to one example, and the method may be applied to the base station and includes the following steps 801 to 803.

At step 801, whether new timing adjustment information needs to be configured for a terminal is determined based on received target information.

In one example of the present disclosure, the base station may, after receiving the target information reported by the terminal, determine, by combining the satellite movement speed and direction and other information, whether the terminal is capable of completing the timing adjustment based on the original timing adjustment information, and if the timing adjustment cannot be completed, the base station may determine that the new timing adjustment information needs to be configured for the terminal. The target information is information related to the new timing adjustment requested by the terminal supporting the IoT service, and the target information includes, but is not limited to, at least one of the Koffset parameter or the new TA value, as desired by the terminal for use in performing the timing adjustment.

At step 802, in a case of determining that the new timing adjustment information does not need to be configured for the terminal, original timing adjustment information is sent, or a target operation is not triggered.

In the example of the present disclosure, the target operation is an operation related to sending the timing adjustment information. In the case of determining that the new timing adjustment information does not need to be configured for the terminal, the base station may not send any timing adjustment information to the terminal, which includes not sending the new timing adjustment information or the original timing adjustment information to the terminal. Alternatively, the base station may send the original timing adjustment information to the terminal.

In the step 803, in a case of determining that the new timing adjustment information needs to be configured for the terminal, the new timing adjustment information is sent after the new timing adjustment information is determined for the terminal.

In the above example, the base station may determine, based on the target information reported by the terminal, whether the new timing adjustment information needs to be configured for the terminal, and furthermore, in the case that the new timing adjustment information does not need to be configured for the terminal, the target operation is not triggered, and in the case that the new timing adjustment information needs to be configured for the terminal, the new timing adjustment information is determined and sent. In the satellite communication system, the problem that the timing adjustment cannot be completed due to the high-speed movement of the satellite is solved, and the reliability of the data interaction is ensured.

Referring to FIG. 9, FIG. 9 is a flow diagram of a timing adjustment method illustrated according to one example, and the method includes the following steps 901 to 903.

At step 901, target information is received. The target information is information related to a new timing adjustment requested by the terminal supporting the IoT service, and the target information includes, but is not limited to, at least one of the Koffset parameter or the TA value, as desired by the terminal for use in performing the timing adjustment.

At step 902, new timing adjustment information is determined for the terminal in response to determining, based on the target information, that the new timing adjustment information needs to be configured for the terminal, In one example of the present disclosure, the base station may determine, by combining the satellite movement speed and direction and the target information, the new timing adjustment information for the terminal, and the new timing adjustment information includes, but is not limited to, at least one of the new Koffset parameter or the new TA value.

At step 903, the new timing adjustment information is sent. The base station may send, to the terminal, the new timing adjustment information determined for the terminal, so that the terminal may perform the timing adjustment based on the new timing adjustment information. The present disclosure can solve the problem that the timing adjustment cannot be completed due to the high-speed movement of the satellite in the satellite communication system, and ensure the reliability of the data interaction.

Referring to FIG. 10, FIG. 10 is a flow diagram of a timing adjustment method illustrated according to one example, and the method includes the following steps 1001 to 1002.

At step 1001, new gap configuration information corresponding to an uplink transmission gap is determined for the terminal. The uplink transmission gap may refer to a gap between any two uplink transmissions during a repeated transmission of uplink data performed by the terminal supporting the IoT service. The base station may determine for the terminal the new gap configuration information corresponding to the uplink transmission gap, and at least partial duration indicated by the new gap configuration information is used for the terminal to perform the timing adjustment.

At step 1002, the new gap configuration information is sent. The base station may determine for the terminal the new gap configuration information corresponding to the uplink transmission gap, and at least partial duration indicated by the new gap configuration information is used for the terminal to perform the timing adjustment. The terminal performs the timing adjustment based on the new gap configuration information, solving the problem that the timing adjustment cannot be completed due to the high-speed movement of the satellite, and ensuring the reliability of the data interaction.

In some examples, referring to FIG. 11, FIG. 11 is a flow diagram of a timing adjustment method illustrated according to one example, and the method may include the following steps 1101 to 1102.

At step 1101, a second gap duration located after a first gap duration is determined. The first gap duration is a duration indicated by original gap configuration information and used for the terminal to perform downlink synchronization, and the second gap duration is used for the terminal to perform the timing adjustment, for example, as shown in FIG. 4B.

At step 1102, the new gap configuration information used for indicating the second gap duration is determined for the terminal. The base station may determine, for the terminal supporting the IoT service, the second gap duration located after the first gap duration, where the first gap duration is the duration indicated by the original gap configuration information and used for the terminal to perform the downlink synchronization, and the second gap duration is indicated by the new gap configuration information and used for the terminal to perform the timing adjustment. Further, the base station may determine for the terminal the new gap configuration information used for indicating the second gap duration. The terminal may perform the timing adjustment in the second gap duration. It is realized to solve the problem that the timing adjustment cannot be completed due to the high-speed movement of the satellite in the satellite communication system, and to ensure the reliability of the data interaction.

Referring to FIG. 12, FIG. 12 is a flow diagram of a timing adjustment method illustrated according to one example, and the method may include the following step 1201.

At step 1201, the new gap configuration information used for indicating a third gap duration is determined for the terminal. The third gap duration is used for the terminal to perform at least one of downlink synchronization or the timing adjustment, for example, as shown in FIG. 5B.

In the above example, the base station may determine, for the terminal supporting the IoT service, the new gap configuration information used for indicating the third gap duration, where the third gap duration is used for the terminal to perform at least one of the downlink synchronization or the timing adjustment. The terminal may perform, based on the new gap configuration information, at least one of the downlink synchronization or the timing adjustment in the third gap duration. The purpose of configuring new timing adjustment information for the terminal supporting the IoT service in the satellite communication system is achieved, solving the problem that timing adjustment cannot be completed due to the high-speed movement of the satellite, and ensuring the reliability of the data interaction.

Referring to FIG. 13, FIG. 13 is a flow diagram of a timing adjustment method illustrated according to one example, and the method may include the following steps 1301 to 1302. At step 1301, the new timing adjustment information is determined for the terminal based on the received target information.

In this example, the target information is information related to a new timing adjustment requested by the terminal supporting the IoT service, and the target information includes, but is not limited to, at least one of the Koffset parameter or the TA value, as desired by the terminal for use in performing the timing adjustment.

At step 1302, a timing adjustment instruction used for indicating the new timing adjustment information is sent. The base station may determine, based on the received target information, the new timing adjustment information for the terminal supporting the IoT service. Furthermore, the base station may indicate, by using the timing adjustment instruction, the terminal to perform the timing adjustment. The present disclosure achieves the purpose of configuring new timing adjustment information for the terminal supporting the IoT service in the satellite communication system, ensuring the reliability of the data interaction.

In some examples, the new timing adjustment information determined by the base station may correspond to one or more terminals. In the case of the new timing adjustment information determined by the base station corresponding to a plurality of terminals, the base station may send, via a broadcast signaling, the timing adjustment instruction used for indicating the new timing adjustment information. The broadcast signaling includes, but is not limited to, system information, a high layer signaling for the plurality of terminals, or a physical layer signaling.

In the case of the new timing adjustment information determined by the base station corresponding to a single terminal, the base station may send, via a unicast signaling, the timing adjustment instruction used for indicating the new timing adjustment information. In one example of the present disclosure, the unicast signaling includes, but is not limited to, a high layer signaling or physical layer signaling, corresponding to the terminal, where the high layer signaling includes, but is not limited to, a radio resource control (RRC) signaling or media access control address (MAC) signaling.

In the above example, the base station may send the new timing adjustment information to the terminal via a signaling, so that the terminal may perform the timing adjustment based on the new timing adjustment information indicated by the timing adjustment instruction, which is easy to implement and has high availability.

FIG. 14 is a flow diagram of a timing adjustment method illustrated according to one example, and the method may include the following steps 1401 to 1402.

At step 1401, a specified time domain position, at which the target information is reported, is determined. The base station may determine for the terminal the specified time domain position at which the target information is reported. In one example, the specified time domain position is located in an uplink transmission resource occupied by an uplink transmission process of the terminal.

At step 1402, indication information carrying the specified time domain position is sent. The base station may send, via a target signaling, the indication information carrying the specified time domain position. The target signaling includes, but is not limited to, a high layer signaling or physical layer signaling. The high layer signaling includes, but is not limited to, a RRC signaling or MAC signaling.

In the above example, the base station may determine for the terminal the specified time domain position at which the target information is reported, so that the terminal reports the target information at the specified time domain position, and the base station determines, based on the target information, the new timing adjustment information for the terminal, which has high availability.

Referring to FIG. 15, FIG. 15 is a flow diagram of a timing adjustment method illustrated according to one example. The method is applied to a satellite communication system, and the terminal may be a terminal supporting the IoT service. In the example of the present disclosure, the base station has determined, based on the target information sent by the terminal, that the new timing adjustment information needs to be configured for the terminal, and the method may include the following steps 1501 to 1505.

At step 1501, the base station determines for the terminal a second gap duration located after a first gap duration. The first gap duration is the duration indicated by the original gap configuration information and used for the terminal to perform downlink synchronization, and the second gap duration is used for the terminal to perform the timing adjustment.

At step 1502, the base station determines for the terminal the new gap configuration information used for indicating the second gap duration.

At step 1503, the base station sends the new gap configuration information.

At step 1504, the terminal performs the downlink synchronization in the first gap duration indicated by the original gap configuration information.

At step 1505, the terminal performs the timing adjustment in the second gap duration indicated by the new gap configuration information.

In the above example, the base station may determine, for the terminal supporting the IoT service, the second gap duration located after the first gap duration, where the first gap duration is the duration indicated by the original gap configuration information and used for the terminal to perform the downlink synchronization, and the second gap duration is indicated by the new gap configuration information and used for the terminal to perform the timing adjustment. Further, the base station determines for the terminal the new gap configuration information used for indicating the second gap duration. The terminal may perform the timing adjustment in the second gap duration. The purpose of configuring new timing adjustment information for the terminal supporting the IoT service in the satellite communication system is achieved, solving the problem that timing adjustment cannot be completed due to the high-speed movement of the satellite, and ensuring the reliability of the data interaction.

Figure 16:
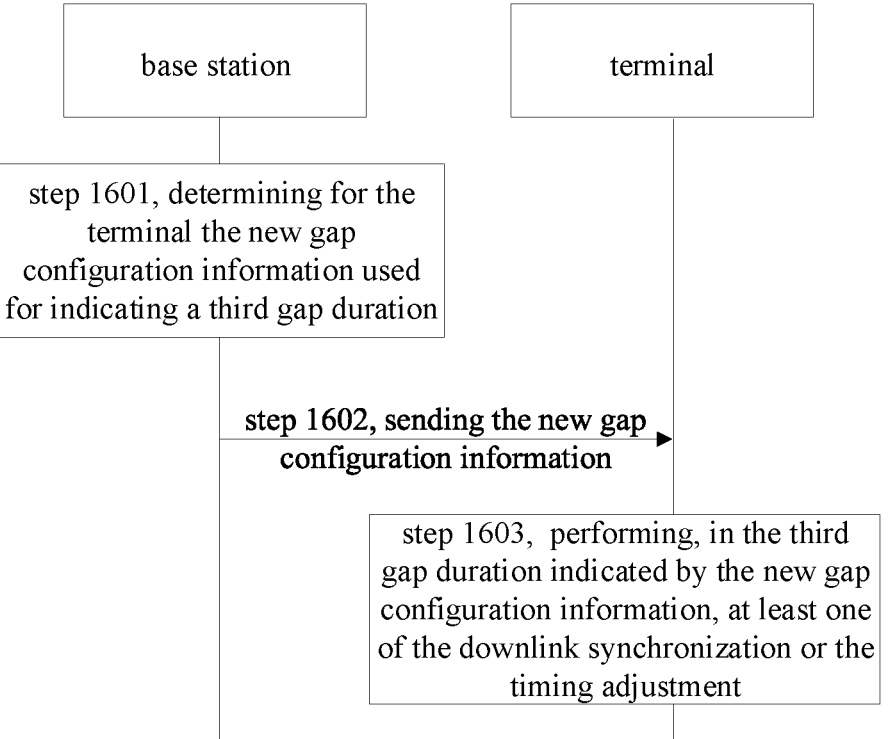
FIG. 16 is a schematic flow diagram of another timing adjustment method illustrated according to one example.

Referring to FIG. 16, FIG. 16 is a flow diagram of a timing adjustment method illustrated according to one example. The method is applied to a satellite communication system, and the terminal may be a terminal supporting the IoT service. In the example of the present disclosure, the base station has determined, based on the target information sent by the terminal, that the new timing adjustment information needs to be configured for the terminal, and the method may include the following steps 1601 to 1603.

At step 1601, the base station determines for the terminal the new gap configuration information used for indicating a third gap duration. The third gap duration is used for the terminal to perform at least one of the downlink synchronization or the timing adjustment.

At step 1602, the base station sends the new gap configuration information.

At step 1603, the terminal performs, in the third gap duration indicated by the new gap configuration information, at least one of the downlink synchronization or the timing adjustment.

In one example of the present disclosure, the base station may determine, for the terminal supporting the IoT service, the new gap configuration information used for indicating the third gap duration, where the third gap duration is used for the terminal to perform at least one of the downlink synchronization or the timing adjustment. The terminal may perform, based on the new gap configuration information, at least one of the downlink synchronization or the timing adjustment in the third gap duration. The purpose of configuring new timing adjustment information for the terminal supporting the IoT service in the satellite communication system is achieved, ensuring the reliability of the data interaction.

Referring to FIG. 17, FIG. 17 is a flow diagram of a timing adjustment method illustrated according to one example. The method is applied to a satellite communication system, and the terminal may be a terminal supporting the IoT service. The method may include the following steps 1701 to 1707.

At step 1701, the base station determines for the terminal a specified time domain position at which the target information is reported.

At step 1702, the base station sends, via a target signaling, indication information carrying the specified time domain position.

In one example of the present disclosure, the steps 1701 to 1702 may be replaced with 1701' (not shown in FIG. 17), where the terminal determines, based on agreement of a protocol, the specified time domain position at which the target information is reported.

At step 1703, the terminal reports the target information at the specified time domain position of the uplink transmission.

The target information may be information related to a new timing adjustment requested by the terminal supporting the IoT service, and the target information includes, but is not limited to, at least one of the Koffset parameter or the TA value, as desired by the terminal for use in performing the timing adjustment.

At step 1704, in the case of determining that the new timing adjustment information does not need to be configured for the terminal, the base station sends original timing adjustment information or does not trigger a target operation.

The target operation is an operation related to sending the timing adjustment information.

At step 1705, the base station determines, in the case of determining that the new timing adjustment information needs to be configured for the terminal, the new timing adjustment information for the terminal based on the target information.

At step 1706, the terminal receives, in an uplink transmission gap, a timing adjustment instruction sent by the base station and used for indicating the timing adjustment information.

In one example of the present disclosure, the timing adjustment information received by the terminal may be the original timing adjustment information, or may be the new timing adjustment information determined by the base station for the terminal.

At step 1707, the terminal performs, after the uplink transmission gap ends, the timing adjustment based on the timing adjustment information, and performs the uplink transmission again.

In one example of the present disclosure, in the case of receiving the original timing adjustment information, the terminal may perform, based on the original timing adjustment information, the timing adjustment in accordance with the relevant arts, and then performs the uplink transmission.

In the case of receiving the new timing adjustment information, the terminal may perform, after the uplink transmission gap ends, the timing adjustment based on the new timing adjustment information, and then performs the uplink transmission again.

In the above example, it is realized to solve the problem that the timing adjustment cannot be completed due to the high-speed movement of the satellite in the satellite communication system, and to ensure the reliability of the data interaction.

Corresponding to the aforementioned examples of application function implementation methods, the present disclosure also provides examples of application function implementation devices.

Figure 18:
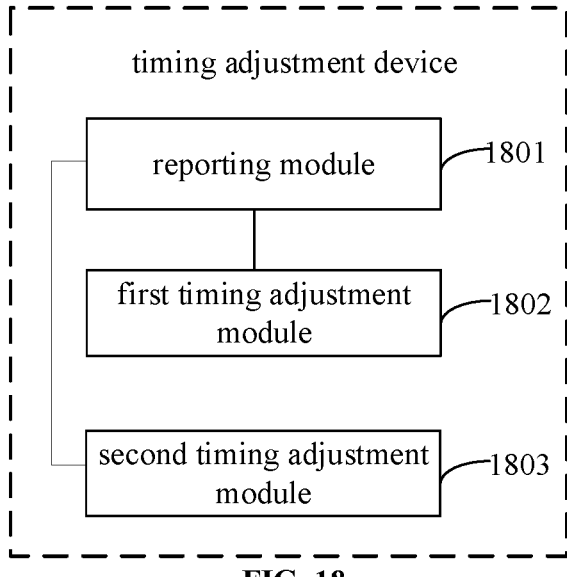
FIG. 18 is a block diagram of a timing adjustment device illustrated according to one example.

Referring to FIG. 18, FIG. 18 is a block diagram of a timing adjustment device illustrated according to one example. The device is applied to a terminal, and includes:

a reporting module 1801, configured to report target information, herein, the target information is information related to a new timing adjustment requested by the terminal; and a first timing adjustment module 1802, configured to perform, in a case of not receiving timing adjustment information, a timing adjustment based on original timing adjustment information; or a second timing adjustment module 1803, configured to perform, in a case of receiving the timing adjustment information, a timing adjustment based on the timing adjustment information.

In one example of the present disclosure, the first timing adjustment module 1802 and the second timing adjustment module 1803 described above may be the same module or different modules, which is not limited in the present disclosure.

Figure 19:
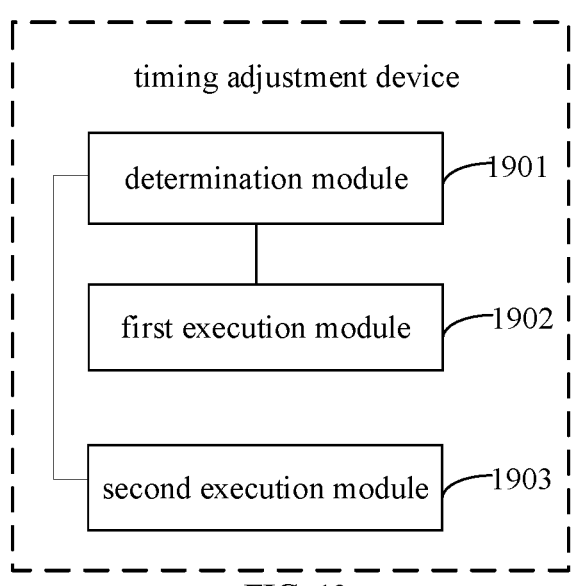
FIG. 19 is a block diagram of another timing adjustment device illustrated according to one example.

Referring to FIG. 19, FIG. 19 is a block diagram of a timing adjustment device illustrated according to one example. The device is applied to a base station, and includes: a determination module 1901, configured to determine, based on received target information, whether new timing adjustment information needs to be configured for a terminal, herein, the target information is information related to a new timing adjustment requested by the terminal supporting an IoT service; and a first execution module 1902, configured to send original timing adjustment information or not trigger an operation for sending the timing adjustment information in a case of determining that the new timing adjustment information does not need to be configured for the terminal; or a second execution module 1903, configured to send, in a case of determining that the new timing adjustment information needs to be configured for the terminal, the new timing adjustment information after determining the new timing adjustment information for the terminal.

In one example of the present disclosure, the first execution module 1902 and the second execution module 1903 described above may be the same module or different modules, which is not limited in the present disclosure.

For the device examples, since they essentially correspond to the method examples, it is sufficient to refer to the partial explanation of the method examples for the relevant aspects. The device examples described above are merely schematic, where the units described above as separate components may or may not be physically separated, and the component displayed as a unit may or may not be a physical unit, i.e., may be located in one place or may be distributed to a plurality of network units. Some or all of these modules may be selected according to practical needs to achieve the purpose of the schemes of the present disclosure. The examples of the present disclosure may be understood and implemented by those ordinary skilled in the art without creative labor.

The present disclosure also provides a computer-readable storage medium, the storage medium stores a computer program, and the computer program is used for implementing any one of the timing adjustment methods described above for the terminal side.

The present disclosure also provides a computer-readable storage medium, the storage medium stores a computer program, and the computer program is used for implementing any one of the timing adjustment methods described above for the base station side.

The present disclosure also provides a timing adjustment device. The timing adjustment device includes: a processor; and a memory, configured to store an instruction executable by the processor. In this example, the processor is configured to implement any one of the timing adjustment methods described above for the terminal side.

Figure 20:
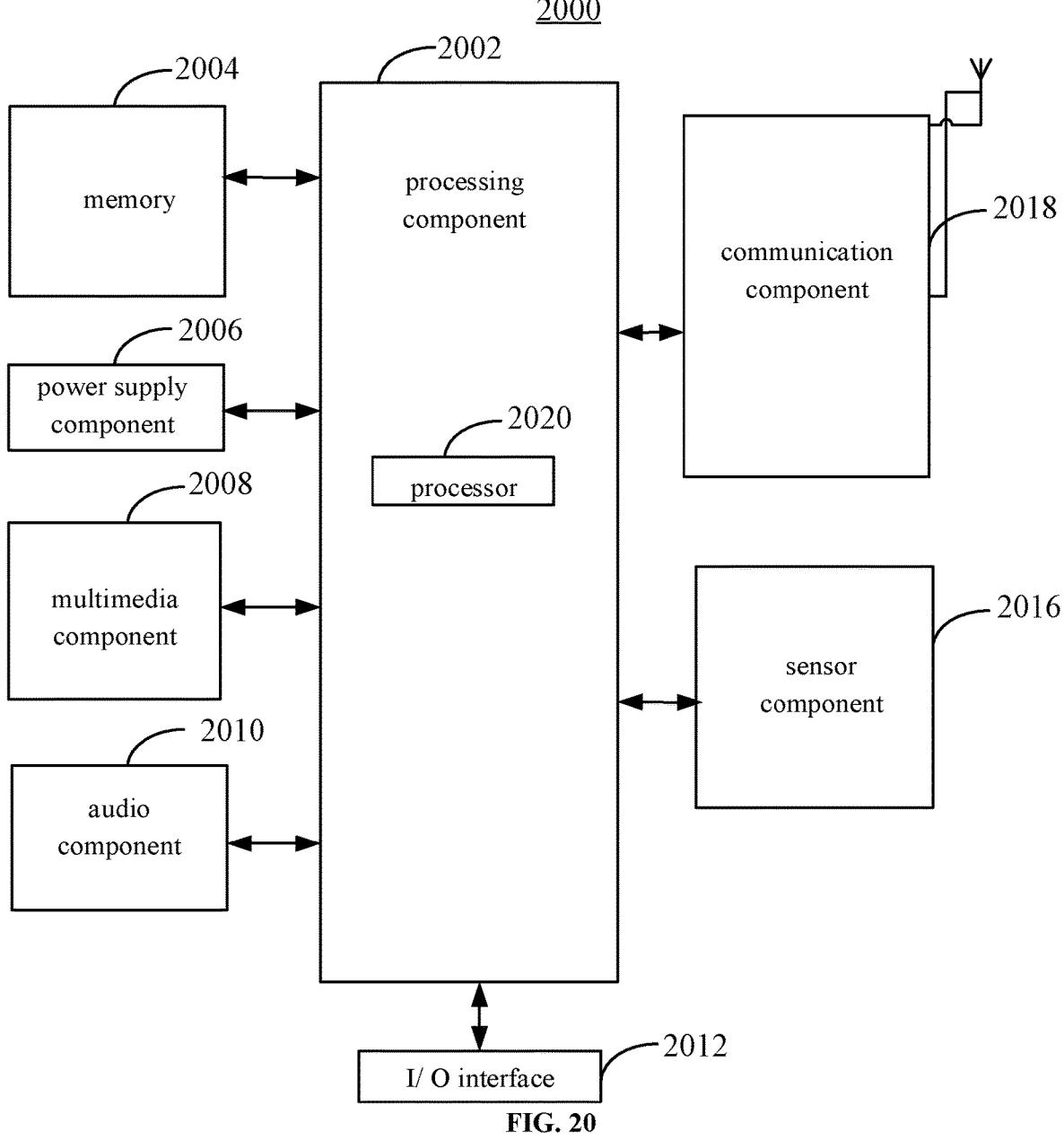
FIG. 20 is a block diagram of an electronic device illustrated according to one example of the present disclosure.

FIG. 20 is a block diagram of an electronic device 2000 illustrated according to one example of the present disclosure. For example, the electronic device 2000 may be a cell phone, a tablet computer, an e-book reader, a multimedia playback device, a wearable device, a vehicle terminal, an iPad, a smart TV, and other terminals.

Referring to FIG. 20, the electronic device 2000 may include one or more of the following components: a processing component 2002, a memory 2004, a power supply component 2006, a multimedia component 2008, an audio component 2010, an input/output (I/O) interface 2012, a sensor component 2016, and a communication component 2018.

The processing component 2002 generally controls the overall operation of the electronic device 2000, such as operations associated with display, telephone calls, data communication, camera operations, and recording operations. The processing component 2002 may include one or more processors 2020 to execute an instruction to complete all or some of the steps of the timing adjustment method described above. In addition, the processing component 2002 may include one or more modules that facilitate interaction between the processing component 2002 and other components. For example, the processing component 2002 may include a multimedia module to facilitate interaction between the multimedia component 2008 and the processing component 2002. For another example, the processing component 2002 may read an executable instruction from the memory to implement the steps of one of the timing adjustment methods provided in the above examples.

The memory 2004 is configured to store various types of data to support the operations at the electronic device 2000. Examples of such data include the following for any application or method to operate on the electronic device 2000: instructions, contact data, phonebook data, messages, pictures, videos, etc. The memory 2004 may be implemented by any type of volatile or non-volatile storage device or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, disk or CD-ROM.

The power supply component 2006 supplies power to various components of the electronic device 2000. The power supply component 2006 may include a power supply management system, one or more power supplies, and other components associated with generating, managing, and distributing power for the electronic device 2000.

The multimedia component 2008 includes a screen that provides an output interface between the electronic device 2000 and a user. In some examples, the multimedia component 2008 includes a front-facing camera and/or a rear-facing camera. The front-facing camera and/or the rear-facing camera may receive external multimedia data when the electronic device 2000 is in an operating mode, such as a shooting mode or a video mode. Each front-facing camera and rear-facing camera may be a fixed optical lens system or have a focal length and optical zoom capability.

The audio component 2010 is configured to output and/or input audio signals. For example, the audio component 2010 includes a microphone (MIC), configured to receive external audio signals when the electronic device 2000 is in an operating mode, such as a call mode, a recording mode, and a voice recognition mode. The received audio signals may be further stored in the memory 2004 or sent via the communication component 2018. In some examples, the audio component 2010 further includes a speaker for outputting the audio signals.

The I/O interface 2012 provides an interface between the processing component 2002 and a peripheral interface module, and the peripheral interface module may be a keypad, a click wheel, a button, etc. These buttons may include, but are not limited to, a home button, a volume button, a start button, and a lock button.

The sensor component 2016 includes one or more sensors, used for providing a status assessment of various aspects of the electronic device 2000. For example, the sensor component 2016 may detect an open/closed state of the electronic device 2000, relative positioning of the component, for example, the component is the display and keypad of the electronic device 2000, the sensor component 2016 may also detect a change in the position of the electronic device 2000 or a change in the position of one component of the electronic device 2000, the presence or absence of user contact with the electronic device 2000, the orientation or acceleration/deceleration of the electronic device 2000, and temperature changes of the electronic device 2000. The sensor component 2016 may include a proximity sensor, configured to detect the presence of nearby objects in the absence of any physical contact. The sensor component 2016 may also include a light sensor, such as a CMOS or CCD image sensor, for use in imaging applications. In some examples, the sensor component 2016 may also include an accelerometer sensor, a gyroscope sensor, a magnetic sensor, a pressure sensor, or a temperature sensor.

The communication component 2018 is configured to facilitate the timing adjustment between the electronic device 2000 and other devices by wired or wireless means. The electronic device 2000 may access a wireless network based on a timing adjustment standard, such as Wi-Fi, 2G, 3G, 4G, 5G, 6G or a combination thereof. In one example, the communication component 2018 receives broadcast signals or broadcast-related information from an external broadcast management system via a broadcast channel. In an example, the communication component 2018 further includes a near-field communication (NFC) module to facilitate short-range communication. For example, the NFC module may be implemented based on radio frequency identification (RFID) technology, infrared data association (IrDA) technology, ultra-wideband (UWB) technology, bluetooth (BT) technology, and other technologies.

In one example, the electronic device 2000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements for performing the above timing adjustment method.

In one example, a non-transitory computer-readable storage medium including an instruction is provided, such as a memory 2004 including an instruction. The instruction described above is capable of being executed by the processor 2020 of the electronic device 2000 to complete the above timing adjustment method. For example, the non-transitory computer-readable storage medium may be a ROM, a random access memory (RAM), a CD-ROM, a magnetic tape, a floppy disk, an optical data storage device, etc.

Accordingly, the present disclosure also provides a timing adjustment device, and the timing adjustment device includes: a processor; and a memory, configured to store an instruction executable by the processor. In this example, the processor is configured to implement any one of the timing adjustment methods described above for the base station side.

Figure 21:
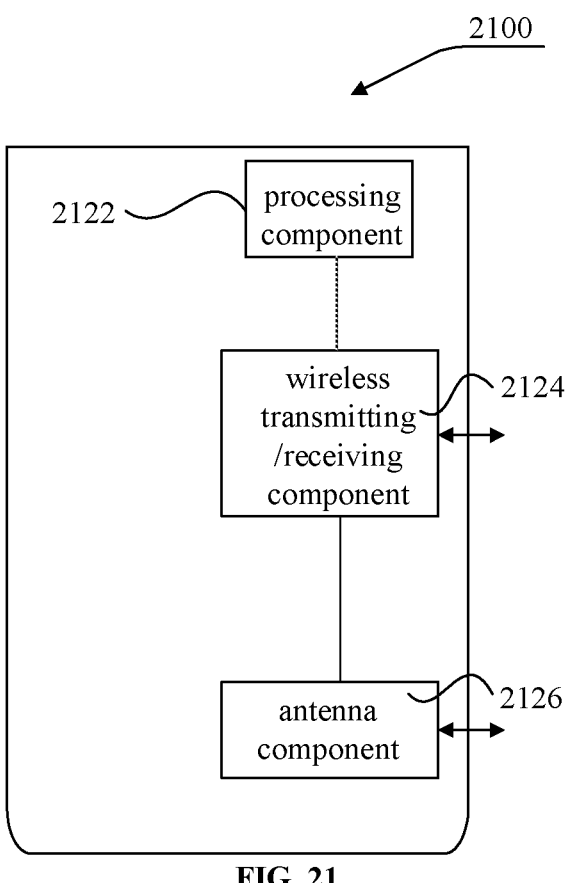
FIG. 21 is a schematic structure diagram of another timing adjustment device illustrated according to one example of the present disclosure.

FIG. 21 is a schematic structure diagram of a timing adjustment device 2100 illustrated according to one example of the present disclosure. The device 2100 may be provided as a base station. The device 2100 includes a processing component 2122, a wireless transmitting/receiving component 2124, an antenna component 2126, and a signal processing portion specific to the wireless interface. The processing component 2122 may further include one or more processors. One of the processors in the processing component 2122 may be configured to implement any one of the timing adjustment methods described above for the base station side.

To overcome the problems in the related arts, examples of the present disclosure provide a timing adjustment method and device, and storage medium. According to a first example of the present disclosure, a timing adjustment method is provided. The method is applied to a terminal supporting an internet of things (IoT) service in a satellite communication system, and includes: reporting target information, the target information is information related to a new timing adjustment requested by the terminal; and performing, in a case of not receiving timing adjustment information, a timing adjustment based on original timing adjustment information; or performing, in a case of receiving timing adjustment information, a timing adjustment based on the timing adjustment information.

In some examples, the performing the timing adjustment based on the timing adjustment information includes: performing, based on an indication of received gap configuration information corresponding to an uplink transmission gap, the timing adjustment in the uplink transmission gap.

In some examples, the gap configuration information is used for indicating a second gap duration of the terminal for performing the timing adjustment, and the performing, based on the indication of the received gap configuration information corresponding to the uplink transmission gap. The timing adjustment in the uplink transmission gap includes: performing the timing adjustment in the second gap duration. In some examples, the method further includes: performing downlink synchronization in a first gap duration indicated by original gap configuration information.

In some examples, the gap configuration information is used for indicating a third gap duration for performing at least one of downlink synchronization or the timing adjustment. Performing, based on the indication of the gap configuration information, the timing adjustment in the uplink transmission gap includes: performing, in the third gap duration, at least one of the downlink synchronization or the timing adjustment.

In some examples, the method further includes: receiving, in an uplink transmission gap, a timing adjustment instruction used for indicating the timing adjustment information. Performing the timing adjustment based on the timing adjustment information includes: performing, after the uplink transmission gap ends, the timing adjustment based on the timing adjustment instruction, and performing a next uplink transmission after performing the timing adjustment.

In some examples, reporting the target information includes: reporting the target information at a specified time domain position of an uplink transmission.

In some examples, the method further includes: receiving indication information used for indicating the specified time domain position; or determining the specified time domain position based on agreement of a protocol.

According to a second example of the present disclosure, a timing adjustment method is provided. The method is applied to a base station in a satellite communication system, and includes: determining, based on received target information, whether new timing adjustment information needs to be configured for a terminal; the target information is information related to a new timing adjustment requested by the terminal supporting an IoT service; and in a case of determining that the new timing adjustment information does not need to be configured for the terminal, sending original timing adjustment information or not triggering a target operation; the target operation is an operation related to sending the timing adjustment information; or sending, in a case of determining that the new timing adjustment information needs to be configured for the terminal, the new timing adjustment information after determining the new timing adjustment information for the terminal.

In some examples, determining the new timing adjustment information for the terminal includes: determining for the terminal new gap configuration information corresponding to an uplink transmission gap; at least partial duration indicated by the new gap configuration information is used for the terminal to perform timing adjustment; and sending the new timing adjustment information include sending the new gap configuration information.

In some examples, determining for the terminal the new gap configuration information corresponding to the uplink transmission gap includes: determining a second gap duration located after a first gap duration; the first gap duration is a duration indicated by original gap configuration information and used for the terminal to perform downlink synchronization, and the second gap duration is used for the terminal to perform the timing adjustment; and determining for the terminal the new gap configuration information used for indicating the second gap duration.

In some examples, the determining for the terminal the new gap configuration information corresponding to the uplink transmission gap includes: determining for the terminal the new gap configuration information used for indicating a third gap duration; the third gap duration is used for the terminal to perform at least one of downlink synchronization or the timing adjustment.

In some examples, the determining the new timing adjustment information for the terminal includes: determining, based on the target information, the new timing adjustment information for the terminal, and the sending the new timing adjustment information includes: sending a timing adjustment instruction used for indicating the new timing adjustment information.

In some examples, the sending the timing adjustment instruction used for indicating the new timing adjustment information includes: sending the timing adjustment instruction via a broadcast signaling in response to the new timing adjustment information corresponding to a plurality of terminals; and sending the timing adjustment instruction via a unicast signaling in response to the new timing adjustment information corresponding to a single terminal.

In some examples, the method further includes: determining a specified time domain position at which the target information is reported; and sending indication information carrying the specified time domain position. Sending the indication information carrying the specified time domain position includes: sending, via a target signaling, the indication information carrying the specified time domain position.

According to a third example of the present disclosure, a timing adjustment device is provided. The device is applied to a terminal supporting an IoT service in a satellite communication system, and includes: a reporting module, configured to report target information; the target information is information related to a new timing adjustment requested by the terminal; and a first timing adjustment module, configured to perform, in a case of not receiving timing adjustment information, a timing adjustment based on original timing adjustment information; or a second timing adjustment module, configured to perform, in a case of receiving the timing adjustment information, a timing adjustment based on the timing adjustment information.

According to a fourth example of the present disclosure, a timing adjustment device is provided. The device is applied to a base station in a satellite communication system, and includes: a determination module, configured to determine, based on received target information, whether new timing adjustment information needs to be configured for a terminal; the target information is information related to a new timing adjustment requested by the terminal supporting an IoT service; and a first execution module, configured to not trigger an operation for sending the timing adjustment information in a case of determining that the new timing adjustment information does not need to be configured for the terminal; or a second execution module, configured to send, in a case of determining that the new timing adjustment information needs to be configured for the terminal, the new timing adjustment information after determining the new timing adjustment information for the terminal.

According to a fifth example of the present disclosure, a computer-readable storage medium is provided. The storage medium stores a computer program, and the computer program is used for implementing the timing adjustment method according to any one of the first example described above.

According to a sixth example of the present disclosure, a computer-readable storage medium is provided. The storage medium stores a computer program, and the computer program is used for implementing the timing adjustment method according to any one of the second example described above.

According to a seventh example of the present disclosure, a timing adjustment device is provided. The timing adjustment device includes: a processor; and a memory, configured to store an instruction executable by the processor; the processor is configured to implement the timing adjustment method according to any one of the first example described above.

According to an eighth example of the present disclosure, a timing adjustment device is provided. The timing adjustment device includes: a processor; and a memory, configured to store an instruction executable by the processor; the processor is configured to implement the timing adjustment method according to any one of the second example described above.

The technical solutions provided by the examples of the present disclosure may include the following beneficial effects.

In one example of the present disclosure, the terminal supporting the IoT service may report the desired new timing adjustment related information, i.e., the target information, to the base station, so that the base station may determine whether to configure new timing adjustment information for the terminal based on the target information. The terminal may, in the case of not receiving the timing adjustment information sent by the base station, perform the timing adjustment based on the original timing adjustment information; or the terminal may, in the case of receiving the timing adjustment information, perform the timing adjustment based on the received timing adjustment information. The present disclosure can solve the problem that the timing adjustment cannot be completed due to the high-speed movement of the satellite in the satellite communication system, and ensure the reliability of the data interaction.

In one example of the present disclosure, the timing adjustment information sent by the base station to the terminal may be new timing adjustment information or original timing adjustment information, and the terminal may perform the timing adjustment based on the received new timing adjustment information or the original timing adjustment information. The present disclosure can solve the problem that the timing adjustment cannot be completed due to the high-speed movement of the satellite in the satellite communication system, and ensure the reliability of the data interaction.

In one example of the present disclosure, the base station may determine for the terminal the new gap configuration information corresponding to the uplink transmission gap, and at least partial duration indicated by the new gap configuration information is used for the terminal to perform the timing adjustment. The terminal performs the timing adjustment based on the new gap configuration information, solving the problem that the timing adjustment cannot be completed due to the high-speed movement of the satellite, and ensuring the reliability of the data interaction.

In one example of the present disclosure, the base station may determine, for the terminal supporting the IoT service, the second gap duration located after the first gap duration, where the first gap duration is the duration indicated by the original gap configuration information and used for the terminal to perform the downlink synchronization, and the second gap duration is indicated by the new gap configuration information and used for the terminal to perform the timing adjustment. Further, the base station determines for the terminal the new gap configuration information used for indicating the second gap duration. The terminal may perform the timing adjustment in the second gap duration. It is realized to solve the problem that the timing adjustment cannot be completed due to the high-speed movement of the satellite in the satellite communication system, and to ensure the reliability of the data interaction.

In one example of the present disclosure, the base station may determine, for the terminal supporting the IoT service, the new gap configuration information used for indicating the third gap duration, where the third gap duration is used for the terminal to perform at least one of the downlink synchronization or the timing adjustment. The terminal may perform, based on the new gap configuration information, at least one of the downlink synchronization or the timing adjustment in the third gap duration. The purpose of configuring new timing adjustment information for the terminal supporting the IoT service in the satellite communication system is achieved, solving the problem that timing adjustment cannot be completed due to the high-speed movement of the satellite, and ensuring the reliability of the data interaction.

In one example of the present disclosure, the base station may determine, based on the received target information, the new timing adjustment information for the terminal supporting the IoT service. The present disclosure achieves the purpose of configuring new timing adjustment information for the terminal supporting the IoT service in the satellite communication system, solving the problem that the timing adjustment cannot be completed due to the high-speed movement of the satellite, and ensuring the reliability of the data interaction.

It should be understood that the present disclosure is not limited to the precise structure already described above and shown in the accompanying drawings, and various modifications and changes may be made without departing from the scope of the present disclosure. The scope of the present disclosure is limited only by the accompanying claims.

What is claimed is:

1. A timing adjustment method for time-frequency synchronization, comprising:

reporting, by a terminal supporting an internet of things (IoT) service in a satellite communication system, target information to a base station, wherein the target information is information related to a timing adjustment requested by the terminal; and performing, by the terminal, in response to the terminal receiving new timing adjustment information from the base station, the timing adjustment based on the new timing adjustment information, wherein performing the timing adjustment based on the new timing adjustment information comprises performing, based on an indication of received gap configuration information corresponding to an uplink transmission gap, the timing adjustment in the uplink transmission gap.

2. The method according to claim 1, wherein the received gap configuration information is used for indicating a second gap duration of the terminal for performing the timing adjustment, and the performing the timing adjustment in the uplink transmission gap comprises: performing the timing adjustment in the second gap duration.

3. The method according to claim 2, further comprising:

performing downlink synchronization in a first gap duration indicated by original gap configuration information.

4. The method according to claim 1, wherein the received gap configuration information is used for indicating a third gap duration, and the performing the timing adjustment in the uplink transmission gap comprises: performing, in the third gap duration, at least one of: downlink synchronization, or the timing adjustment.

5. The method according to claim 1, further comprising:

receiving, in the uplink transmission gap, a timing adjustment instruction used for indicating the new timing adjustment information; wherein performing the timing adjustment based on the new timing adjustment information comprises:

performing, after the uplink transmission gap ends, the timing adjustment based on the timing adjustment instruction, and performing a next uplink transmission after performing the timing adjustment.

6. The method according to claim 1, wherein the reporting the target information comprises: reporting the target information at a specified time domain position of an uplink transmission.

7. The method according to claim 6, further comprising:

receiving indication information used for indicating the specified time domain position; or determining the specified time domain position based on a protocol.

8. A non-transitory computer-readable storage medium, storing a computer program, wherein the computer program is used for implementing the timing adjustment method according to claim 1.

9. The method according to claim 1, further comprising:

performing, by the terminal, in response to not receiving the new timing adjustment information, the timing adjustment based on original timing adjustment information previously configured by the base station for the terminal.

10. A timing adjustment method for time-frequency synchronization, comprising:

determining, by a base station in a satellite communication system, based on received target information from a terminal, whether new timing adjustment information needs to be configured for the terminal, wherein the target information is information related to a timing adjustment requested by the terminal supporting an internet of things (IoT) service; and sending to the terminal, by the base station, in response to determining, by the base station, that the new timing adjustment information needs to be configured for the terminal, the new timing adjustment information after determining, by the base station, the new timing adjustment information for the terminal; wherein determining the new timing adjustment information comprises determining new gap configuration information corresponding to an uplink transmission gap, wherein at least partial duration indicated by the new gap configuration information is used for the terminal to perform the timing adjustment; and sending the new timing adjustment information comprises sending the new gap configuration information.

11. The method according to claim 10, wherein the determining the new gap configuration information comprises:

determining a second gap duration located after a first gap duration, wherein the first gap duration is a duration indicated by original gap configuration information and used for the terminal to perform downlink synchronization, and the second gap duration is used for the terminal to perform the timing adjustment; and determining the new gap configuration information used for indicating the second gap duration.

12. The method according to claim 10, wherein the determining the new gap configuration information comprises:

determining the new gap configuration information used for indicating a third gap duration, wherein the third gap duration is used for the terminal to perform at least one of downlink synchronization or the timing adjustment.

13. The method according to claim 10, wherein determining the new timing adjustment information comprises determining, based on the target information, the new timing adjustment information; and sending the new timing adjustment information comprises sending a timing adjustment instruction used for indicating the new timing adjustment information.

14. The method according to claim 13, wherein the sending the timing adjustment instruction comprises:

sending the timing adjustment instruction via a broadcast signaling in response to the new timing adjustment information corresponding to a plurality of terminals;

sending the timing adjustment instruction via a unicast signaling in response to the new timing adjustment information corresponding to a single terminal.

15. The method according to claim 10, further comprising:

determining a specified time domain position at which the target information is reported; and sending indication information carrying the specified time domain position.

16. The method according to claim 15, wherein the sending the indication information carrying the specified time domain position comprises:

sending, via a target signaling, the indication information carrying the specified time domain position.

17. A non-transitory computer-readable storage medium, storing a computer program, wherein the computer program is used for implementing the timing adjustment method according to claim 10.

18. A timing adjustment device for time-frequency synchronization, comprising:

a processor; and a memory, configured to store an instruction executable by the processor; wherein the processor is configured to implement the timing adjustment method according to claim 10.

19. The method according to claim 10, further comprising:

in response to determining that the new timing adjustment information does not need to be configured for the terminal, sending, by the base station, original timing adjustment information, or not triggering, by the base station, a target operation, wherein the target operation is an operation related to sending the new timing adjustment information.

20. A timing adjustment device for time-frequency synchronization, comprising:

a processor; and a memory, configured to store an instruction executable by the processor; wherein the processor, through executing the instruction, is configured to:

report, by a terminal supporting an internet of things (IoT) service in a satellite communication system, target information to a base station, wherein the target information is information related to a timing adjustment requested by the terminal; and perform, by the terminal, in response to the terminal receiving new timing adjustment information from the base station, the timing adjustment based on the new timing adjustment information;

wherein the processor is further configured to:

perform, based on an indication of received gap configuration information corresponding to an uplink transmission gap, the timing adjustment in the uplink transmission gap.

* * * * *